Feb. 2, 1960           J. J. ERNST           2,923,790
POSITIVE ACTION LOW PRESSURE PUMP CUT-OFF SWITCH ATTACHMENT
Filed Dec. 27, 1957           2 Sheets-Sheet 1

John J. Ernst
INVENTOR.

Feb. 2, 1960 J. J. ERNST 2,923,790
POSITIVE ACTION LOW PRESSURE PUMP CUT-OFF SWITCH ATTACHMENT
Filed Dec. 27, 1957 2 Sheets-Sheet 2

John J. Ernst
INVENTOR.

BY
Attorneys

United States Patent Office 2,923,790
Patented Feb. 2, 1960

2,923,790

POSITIVE ACTION LOW PRESSURE PUMP CUT-OFF SWITCH ATTACHMENT

John J. Ernst, Agra, Okla.

Application December 27, 1957, Serial No. 705,624

7 Claims. (Cl. 200—83)

This invention comprises a novel and useful positive action low pressure pump cut-off switch and more particularly relates to a construction adapted to modify and improve a conventional type of pressure actuated pump cut-off switch to incorporate therein a safety feature for cutting off a pump motor in the event that the pump motor is incapable of building up a predetermined pressure in a storage tank.

In fluid pressure storage systems such as those in which a pump driven by an electric motor stores water in a tank and maintains a service pressure varying between a predetermined minimum and maximum pressure therein, it is customary to provide a pressure actuated switch which will cut off the supply of electric current to a motor driving the pump when the predetermined maximum pressure has been obtained; and will complete the electric circuit to the motor for again starting the pump when the pressure in the storage tank drops below the predetermined minimum pressure.

If for any reason, however, as for example owing to a temporary failure of the supply of fluid to the pump, the pressure in the storage tank fails to build up to the predetermined maximum pressure, the electric circuit will remain closed and the pump will run indefinitely, thereby causing overheating and damage to the pump. In order to correct this dangerous condition, it has been heretofore necessary to provide a separate switch in such a motor control circuit in order that the supply of current to the motor may be cut off if the pump fails to attain the desired predetermined maximum pressure in its storage system.

Frequently, owing to lack of adequate space, it may be difficult to provide such safety switch for breaking the motor circuit when the pump fails to produce the desired maximum pressure. In any event, considerable additional expense is involved in installing such safety switch, and a further difficulty arises from the necessity for adjusting the range of action of the safety switch whenever the range of action of the pressure actuated automatic switch is adjusted for any reason.

It is therefore the primary purpose of this invention to provide a construction which may be applied to a conventional automatic pressure actuated pump cut-off switch and which shall be effective to automatically open the motor circuit if the pressure produced by the pump drops below a predetermined value, which latter will lie below the predetermined minimum pressure of the automatic system, and which will be indicative of a failure of the fluid supply to the pump.

A further object of the invention is to provide a construction which may be supplied to certain conventional types of automatic pressure actuated cut-off switches either as an attachment thereto or which may be incorporated into the construction of the switch during the initial fabrication of the same.

Yet another object of the invention is to provide a safety device applicable to automatic pressure actuated pump cut-off switches and wherein the pressure at which the safety device operates shall be automatically varied in accordance with variation in the range of operation of the automatic switch cut-off pressure and cut-on pressure.

Yet another object of the invention is to provide a safety device in accordance with the immediately preceding object which will admit of independent adjustment of the pressure at which the safety device functions to break the circuit of the electric motor driving the pump.

A still further object of the invention is to provide a safety device in conformity with the preceding objects which shall have a positive action in opening the switch contacts and breaking the eltric circuit controlled by the automatic pressure actuated cut-off switch when the pressure on the output side of the pump drops below the predetermined value for which the safety device is set.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a top plan view of the switch of Figure 1 but with the cover or enclosing housing being removed from;

Figure 1:
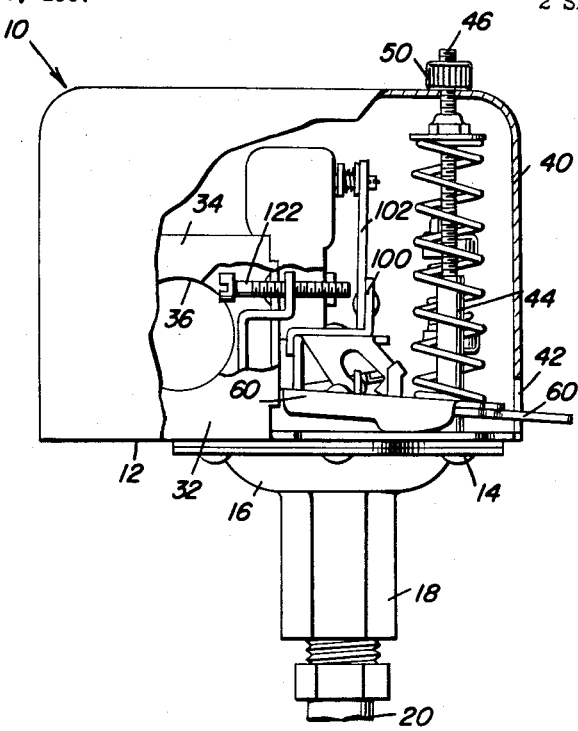
Figure 1 is a side elevational view, parts being broken away, showing a conventional form of an automatic pressure actuated pump cut-off switch to which the safety device of the present invention has been applied.

Although the principles of this invention are applicable to numerous conventional types of pressure actuated cut-off switches, the accompanying drawings illustrate the safety device in accordance with this invention as applied to the conventional type of automatic pressure cut-off switch commercially available upon the market under the trade means of Square-D, Westinghouse and General Electric among others. In the drawing the conventional automatic pressure actuated cut-off switch is designated generally by the numeral 10 and the same includes a supporting base 12 to which is attached upon the underside thereof as by fasteners 14, a dish-shaped casing 16 from which depends a sleeve 18 connected to a conduit 20. Conveniently, the casing 16 and sleeve 18 serve as a means by which the switch assembly 10 is supported and mounted, the conduit 20 being connected with the pressure system supplied by the pump, not shown, and at the outlet side of the latter. A nipple 22 forms an inlet into the casing 16 by means of which the pressure supplied by the conduit 20 is placed in communication with the interior of the casing 16. A flexible diaphragm 24 extends across the casing 16, and is disposed between that casing and the base plate 12, being held in place by the above mentioned fasteners 14. Above the chamber 16 the base plate is provided with an upwardly dished portion 26 which is complementary to the casing 16 and forms therewith a pressure chamber. The diaphragm divides this pressure chamber into upper and lower chambers, the lower chamber being in communication with the fluid pressure as above mentioned, so that as a fluid pressure is varied, the diaphragm is caused to rise or fall and thus actuate the switch mechanism as set forth hereinafter.

Resting upon and secured to the upper surface of the diaphragm 24 is a plate 28 having an upwardly extending projection 30 which extends upwardly through an opening in the upwardly dished portion 26 so that the projection 30 will be vertically moved by and in accordance with flexing of the diaphragm 24.

At one end of the base plate 12 there is provided a pair of upstanding side walls 32 and 34, apertured as at 36 for providing means whereby electrical cables, not shown, may be introduced into the interior of the switch assembly for connection to the switch contacts therein. These cables connect the switch to a source of current and also to an electric motor, which operates a pump, these elements being well understood as constituting a part of an electric motor actuated pump pressure system, not shown. At the end remote from the side walls 32, the base plate 12 is provided with a forwardly extending tab or projection 38 and an enclosing cover 40 is placed down over and surrounds the side walls 32 and 34, rests upon the base plate 12, and at one end thereof is provided with a vertical notch or slot 42 which receives the above-mentioned tab 38 to properly position the cover in place. Rising from the base plate 12 is a standard 44 having a screw 46 at its upper end which screw extends through an aperture 48 in the cover and receives a thumb nut 50 by which the cover is removably secured to the base.

Supported between the side walls 32 and 34, and disposed between the upper portions of the same is a support block 52 of an insulating material and which is provided with sets of electric terminals 54 having binding posts or fasteners 56 by means of which electric cables passing through the previously mentioned openings 36 may be secured thereto. These terminals 54 constitute the stationary terminals of the switch member and movable contacts operated by the pressure actuated mechanism that is hereinafter described cooperate therewith to control the circuit of the electric motor.

Figure 4:
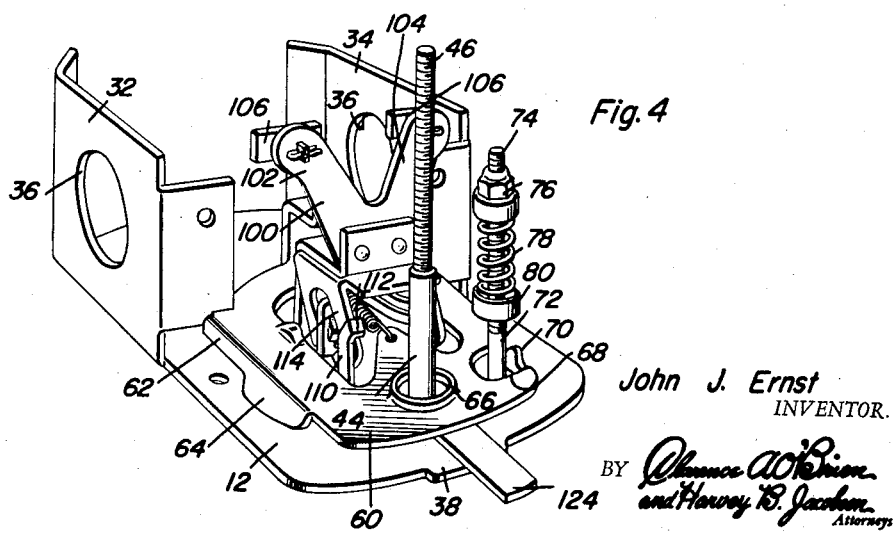
Figure 4 is a perspective view of the supporting base and the operating mechanism of the switch but with the stationary switch contacts removed therefrom.

In the above mentioned well-known types of pressure actuated cut-off switches, there is provided a switch actuating plate 60 which is modified in accordance with this invention as set forth hereinafter to provide a safety device therefor, this conventional switch actuating plate 60 comprising a substantially rectangular frame having parallel depending side walls 62 which adjacent their midportion are provided with depending projections comprising rockers 64 which rest upon the base plate 12. The actuating plate is provided with an aperture as at 66 to loosely receive the standard 44 therethrough as best shown in Figure 4. A further aperture 68 is also provided having upon one edge thereof an upturned projection 70, and a standard 72 is carried by the base plate 12 extends upwardly through this aperture 68, is externally threaded as at 74 and is provided with an adjusting nut 76 and a compression spring 78, the latter having a spring retainer 80. The arrangement is such that upon upward rocking movement of the switch actuating plate 60, the projection 70 will engage the retainer 80 whereby the spring 78 will resist with increasing resistance further upward movement of the plate. By adjusting the nut, it is obvious that the resistance of this spring can be varied.

Surrounding the previously mentioned screw 46 is a compression spring 82 which abuts at its lower end against the switch actuating plate 60 and which is provided with a spring retainer 84 and an adjusting nut 86. The spring 82 provides a downward pressure at all times upon the switch actuating plate 60 which pressure may be adjusted as above mentioned, while the spring 78 applies a pressure to the switch actuating plate 60 only when the latter is in a raised position.

A switch blade 100 is thus mounted upon the switch actuating plate 60 for rocking movement therewith, this blade having a pair of arms, see Figure 4, 102 and 104 which carry resiliently mounted movable contacts 106 thereon and which cooperate with the previously mentioned fixed terminals 54.

The arrangement is such that the spring 82 normally urges the actuating plate 60 into a downward position tending to open the switch contacts, while the pressure from the conduit 20 applied into the casing 16 urges the diaphragm 24 upwardly by the connection of the projection 30 with the switch actuating plate 60 tends to urge the movable contacts to the switch closing position against the stationary terminals.

In the ordinary operation of the device, when the pressure in the conduit exceeds 40 lbs., or the predetermined maximum pressure for which the switch is set, the switch actuated plate 60 will be is its uppermost raised position, compressing the spring 78 as well as the spring 82, and thus causing the movable contacts to disengage the fixed contacts and thus break the circuit, stopping the electric motor and the pump driven thereby. When the pressure drops to 20 lbs., or the predetermined minimum pressure for which the switch is set, the plate 60 will move down until the projection 70 thereof disengages the spring retainer 80, and the spring 82 will have its force alone applied to the plate 60. As the latter moves downward, to this predetermined amount of pressure, the switch blade 100 will be moved to the closed position again starting the motor for building up the pressure to the desired predetermined maximum of pressure.

However, if the pressure continues to drop below this predetermined minimum pressure, as for example down to about 8 lbs., which situation would arise if the well is pumped dry or there is no supply of liquid to the pump, the safety device of the present invention goes into operation and positively moves the movable contacts away from the fixed contacts again break in the circuit. Thus, when the pressure reaches a predetermined low pressure for which the safety device is set, the device automatically stops further operation of the electric motor until such time as the lack of liquid to the intake of the pump has been remedied and the switch can be manually re-set in starting position.

Figure 5:
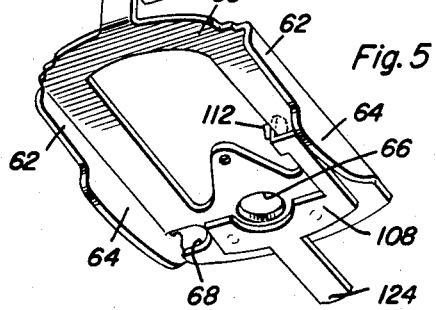
Figure 5 is a perspective view from the bottom of the switch actuating member to which the principles of the present invention have been applied.

The safety device in accordance with this invention consists of an L-shaped plate 108, see Figure 5, which is welded or otherwise rigidly attached to the underside of the switch actuating plate 60, and which has an upwardly projecting arm 110, see Figure 4, carrying a hook or bracket 112 of the upper end thereof. This hook overlies the arm 114 to which the previously mentioned switch plate 100 is connected so that when the actuating plate 60 moves downwardly, this will grip the arm 114 and positively move the switch blade 100 to switch opening position.

Figure 2:
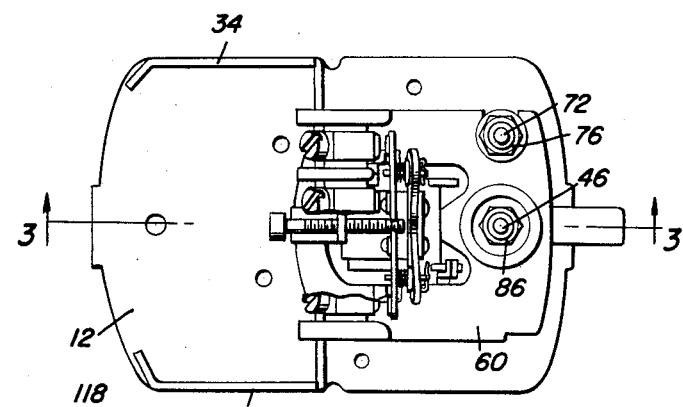
Figure 3:
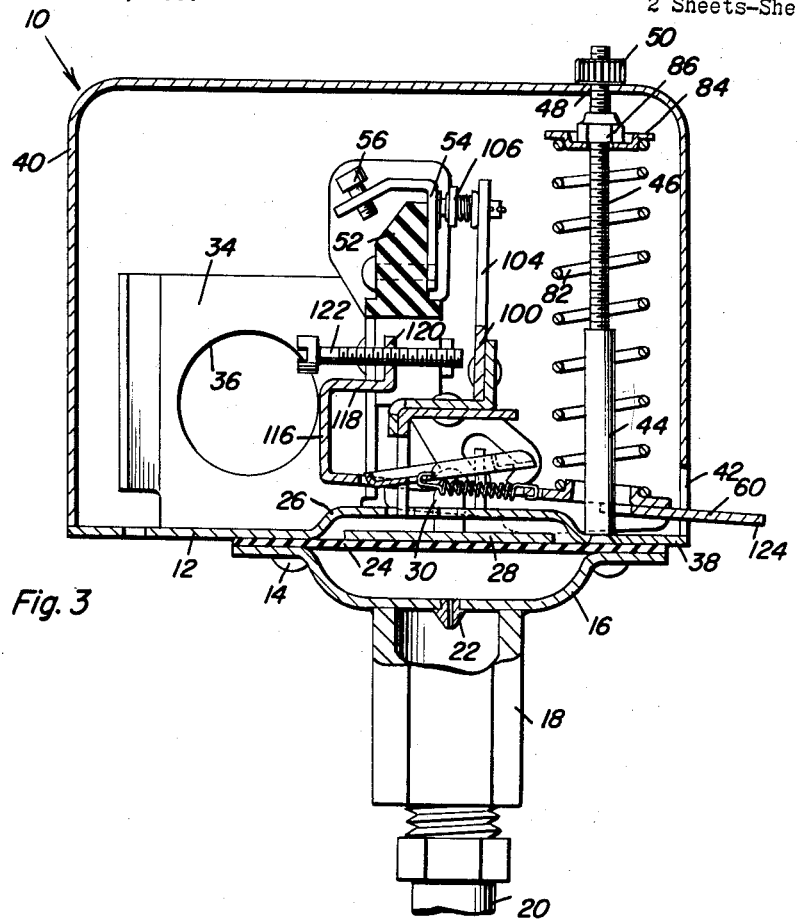
Figure 3 is a view in vertical longitudinal section taken substantially upon the plane indicated by the section line 3—3 of Figure 2 and upon an enlarged scale, and showing the internal structure and working mechanism of the automatic pressure actuated pump cut-off switch with the safety device of this invention applied thereto.

As shown more clearly in Figures 2 and 3, the plate 60 at its rear end has an upwardly projecting arm 116 carrying a forwardly extending portion 118 having an upturned flange 120. The latter is apertured and screw-threaded to receive an adjusting screw 122 whose forward end is positioned to abut the switch blade 100 and thereby positively move the latter away from the fixed terminals 54 when the switch plate 60 is in its lowered position. Thus, in addition to the positive actuation of the switch blade by the engagement of the member 112 of the member 114, there is a further positive actuation by engaging of the adjusting screw 122 with the switch blade 100.

Secured to the forward end of the actuating plate 60 as by welding or the like is a forwardly projecting tab 124 extending through slot 42 and comprising a finger-grip means whereby the switch plate may be manually raised and held in a raised position to allow the previously mentioned spring mechanism to close the switch contacts, with the two members 112 and 122 being disengaged from the arm 114 and the switch plate 100 respectively. This enables the motor to be started and gives the pump opportunity to restore the pressure in the conduit 20 and casing 16 to the desired predetermined minimum pressure which will then hold the contacts closed in accordance with the normal operation of the pressure switch.

In some instances, as where a cheaper construction is desired, either the member 108 may be omitted and only the member 116 and adjusting screw 122 relied upon, or the latter may be omitted and the member 108 may constitute the sole means for effecting the safety action in opening the switch contacts. Further, although the adjusting means 122 has been shown as carried by the member 116, it will be understood that the same may be employed with the member 112 if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an automatic pressure actuated pump cut-off switch of the type having fixed and movable switch contacts controlling an electric circuit, a switch blade carrying said movable contacts, a switch actuating plate, means connecting the latter to said switch blade for actuation thereof, means for applying fluid pressure variations to said plate for actuation of the latter, a first spring means connected to said plate and opposing actuation of said plate by said fluid pressure applying means and of such strength as to close said contacts when the fluid pressure drops below a predetermined pressure range and to open said contacts when the fluid pressure exceeds said predetermined pressure range, a safety device for operating said plate to open said contacts when the fluid pressure drops to a predetermined value below said predetermined range, said safety device comprising a second spring means engaging said plate, a member mounted upon said plate and engageable with said connecting means to operate the same and move said switch blade to contact opening position when the fluid pressure decreases to said predetermined value.

2. The combination of claim 1 wherein said member has a portion engageable with said switch blade for moving the latter.

3. The combination of claim 2 wherein said portion carries an adjusting screw engageable with said switch blade.

4. The combination of claim 1 wherein said member is mounted at the front portion of said plate and includes an upstanding portion having a hook engaging a portion of said connecting means for pulling the latter downwardly to move said switch blade to contact opening position.

5. The combination of claim 1 wherein said safety device includes a second member mounted on said plate, said member being positioned at opposite ends of said plate.

6. The combination of claim 5 wherein the first mentioned member directly engages said switch blade and the second member directly engages said connecting means.

7. The combination of claim 1 wherein said member is mounted at the front portion of said plate and includes an upstanding portion having a hook engaging a portion of said connecting means for pulling the latter downwardly to move said switch blade to contact opening position, said member comprising a bracket having an L-shaped foot secured to the underside of said plate and said upstanding portion extending through said plate and projecting thereabove.

References Cited in the file of this patent

UNITED STATES PATENTS

| | | |
|---|---|---|
| 2,680,168 | Murphy | June 1, 1954 |
| 2,692,922 | Millsap | Oct. 26, 1954 |
| 2,741,677 | Clendenin | Apr. 10, 1956 |
| 2,741,678 | Schaefer | Apr. 10, 1956 |
| 2,765,743 | Hollinshead | Oct. 9, 1956 |
| 2,767,277 | Wirth | Oct. 16, 1956 |